(12) United States Patent
Moshe et al.

(10) Patent No.: US 11,971,771 B2
(45) Date of Patent: Apr. 30, 2024

(54) PEER STORAGE DEVICE MESSAGING FOR POWER MANAGEMENT

(71) Applicant: Western Digital Technologies, Inc., San Jose, CA (US)

(72) Inventors: Eran Moshe, Kfar Saba (IL); Danny Berler, Tel-Mond (IL)

(73) Assignee: Western Digital Technologies, Inc., San Jose, CA (US)

( * ) Notice: Subject to any disclaimer, the term of this patent is extended or adjusted under 35 U.S.C. 154(b) by 268 days.

(21) Appl. No.: 17/583,402

(22) Filed: Jan. 25, 2022

(65) Prior Publication Data

US 2023/0236652 A1 Jul. 27, 2023

(51) Int. Cl.
*G06F 1/32* (2019.01)
*G06F 1/3234* (2019.01)

(52) U.S. Cl.
CPC .................. *G06F 1/3268* (2013.01)

(58) Field of Classification Search
CPC .................................................. G06F 1/3268
See application file for complete search history.

(56) References Cited

U.S. PATENT DOCUMENTS

| | | | |
|---|---|---|---|
| 7,117,211 B2 | 10/2006 | Whittingham et al. | |
| 7,177,211 B2 | 2/2007 | Zimmerman | |
| 7,783,777 B1 | 8/2010 | Pabla et al. | |
| 8,239,597 B2 | 8/2012 | Wishneusky | |
| 9,025,495 B1 | 5/2015 | Brown et al. | |
| 9,448,614 B2 | 9/2016 | Slik | |
| 10,481,990 B2 | 11/2019 | Eder et al. | |
| 10,580,512 B2 | 3/2020 | Subramanian et al. | |
| 2001/0044879 A1 | 11/2001 | Moulton et al. | |
| 2003/0163599 A1 | 8/2003 | Hills et al. | |
| 2005/0055602 A1 | 3/2005 | Werner et al. | |
| 2008/0256292 A1 | 10/2008 | Flynn et al. | |
| 2009/0030986 A1 | 1/2009 | Bates | |
| 2010/0088531 A1 | 4/2010 | Gao et al. | |
| 2010/0124196 A1 | 5/2010 | Bonar et al. | |
| 2010/0165896 A1 | 7/2010 | Gong et al. | |
| 2012/0066439 A1 | 3/2012 | Fillingim | |

(Continued)

OTHER PUBLICATIONS

Nakamura et al., "How beneficial is peer-to-peer DMA?" Proceedings of the 11th ACM SIGOPS Asia-Pacific Workshop on Systems (APSys '20), Association for computing Machinery, New York, NY, https://doi.org/10.1145/3409963.3410491, Aug. 24, 2020, pp. 25-32.

(Continued)

*Primary Examiner* — Mark A Connolly
(74) *Attorney, Agent, or Firm* — PATENT LAW WORKS LLP

(57) ABSTRACT

Systems and methods for peer data storage device messaging over a control bus for power management are disclosed. Storage devices may include a host interface configured to connect to a host system and a control bus interface to connect to a control bus. Peer data storage devices may establish peer communication through the control bus interface, determine a power state, receive a power change indicator from a peer data storage device, and initiate a change in their power state. The peer data storage devices may manage their collective power as a power pool and increase or decrease power use without host intervention.

20 Claims, 8 Drawing Sheets

(56) References Cited

U.S. PATENT DOCUMENTS

| | | | |
|---|---|---|---|
| 2012/0226927 A1* | 9/2012 | Kagan | G06F 1/3225 |
| | | | 713/323 |
| 2019/0034306 A1 | 1/2019 | Wysocki et al. | |
| 2019/0146709 A1 | 5/2019 | Im et al. | |
| 2020/0042380 A1 | 2/2020 | Roberts | |
| 2020/0042390 A1 | 2/2020 | Roberts | |
| 2020/0257590 A1 | 8/2020 | Bolkhovitin et al. | |
| 2020/0327018 A1 | 10/2020 | Park et al. | |
| 2021/0149757 A1 | 5/2021 | Ozturk et al. | |
| 2022/0164139 A1* | 5/2022 | Moshe | G06F 3/0683 |

OTHER PUBLICATIONS

International Search Report and Written Opinion for International Application No. PCT/US2021/031955, dated Jul. 28, 2021, 21 pgs.
International Search Report and Written Opinion for International Application No. PCT/US2021/031962, dated Aug. 4, 2021, 9 pgs.
Jones, "Digital Power Management," Analog Devices, https://www.analog.com/ru/technical-articles/digital-power-management.html, retrieved Aug. 10, 2020, 8 pgs.

* cited by examiner

PEER STORAGE DEVICE MESSAGING FOR POWER MANAGEMENT

TECHNICAL FIELD

The present disclosure generally relates to power management for computing system devices interconnected through a low-bandwidth bus and, more particularly, to peer device power management without host system intervention.

BACKGROUND

Some computing systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, each storage device may also include another interface that is configured for power management and/or low-bandwidth communication with computing devices sharing the same utility or control bus. For example, storage devices may include a control bus interface that complies with inter-integrated circuit (I2C), improved inter-integrated circuit (I3C), system management bus (SMBus), or similar low-bandwidth control bus protocols. These command buses may interconnect the storage devices within a multi-device storage system and provide a synchronous, multi-master, packet switched, serial communication bus. In some computing systems, control bus pins may be included as part of the physical peripheral interface connector. So, for example, a PCIe physical interface connector may include a set of I2C, I3C, or SMBus pins at one end of the connector for providing the low-bandwidth control interface. For comparison to the high-bandwidth peripheral interfaces used for data transfer, these low-bandwidth control bus interfaces may support ~3-30 megabits (Mb)/s and may operate as low as 100 kilobits (kb)/s.

In some systems, the low-bandwidth control bus may be initialized for communication early in the boot cycle of the storage devices to assist with power management, discovery, and access to external resources, such as temperature sensors, fan controllers, light emitting diode (LED) indicators, etc. Storage devices may have access to the control bus before host communication or control is established through the high-bandwidth peripheral bus.

Host systems may manage power states for a set of storage devices, such as normal, low power, and off modes. In general, the host system may manage the power states collectively (all storage devices in the same power mode) or selectively power down specific devices to maintain a total power value within desired operating parameters for the host system. However, the host system may not have the best visibility into the power consumption needs of individual storage devices and/or may represent a delay in power management decisions.

Offloading power management to peer data storage devices without waiting for or relying on the host system may be advantageous. A reliable way of offloading power management to peer storage devices without relying on peripheral or storage bus communications with the host may be needed.

SUMMARY

Various aspects for peer storage device power management, particularly messaging among peer storage devices over a low-bandwidth control bus for coordination of power states across peer storage devices, are described.

One general aspect includes a system including a first data storage device that includes: a processor; a memory; a host interface configured to connect to a host system; a control bus interface configured to connect to a control bus, where a plurality of peer data storage devices are configured to connect to the control bus; a power manager configured to determine a power state of the first data storage device; a peer messaging service configured to establish, through the control bus interface, peer messaging service configured to establish, through the control bus interface, peer communication with the plurality of peer data storage devices; and a peer power management service configured to receive, through the peer messaging service, a power change indicator and initiate, responsive to the power change indicator, a change in the power state of the first data storage device.

Implementations may include one or more of the following features. The power change indicator may be configured as a value in a payload of a peer message that indicates that another peer data storage device of the plurality of peer data storage devices is in a low power state, and the power manager may be further configured to increase, responsive to the initiated change in the power state, the power use of the first data storage device. Increasing the power use of the first data storage device may include entering an overclock range for the first data storage device. The power change indicator may include an amount of available power in a power pool corresponding to the plurality of peer data storage devices, and increasing the power use of the first data storage device may be based on the amount of available power in the power pool. The peer power management service may be further configured to send, through the peer messaging service, a device power value to at least one data storage device of the plurality of peer data storage devices, and the peer messaging service may be further configured to receive the power change indicator responsive to sending the device power value. The first data storage device and each peer data storage device in the plurality of peer data storage devices may be configured to broadcast, through the peer messaging service, a respective device power value to each other peer data storage device. The device power value may include at least one value selected from: a host power mode, a predicted power use value, and a device power state. The peer power management service may be further configured to send, through the peer messaging service, a power request to at least one peer storage device of the plurality of peer data storage devices; and the peer messaging service may be further configured to receive the power change indicator responsive to sending the power request. The system may further include the plurality of peer data storage devices, a second data storage device of the plurality of peer data storage devices may include a power pool collector, and the power pool collector may be configured to: receive, from the first data storage device and each other peer storage device of the plurality of peer storage devices, a corresponding device power value; determine, based on aggregating device power values, a power pool value for the first data storage device and the plurality of peer data storage devices; determine, based on the power pool value, the power change indicator; and send, to the first data storage device, the power change indicator. The power pool collector may be further configured to receive, from the first data storage device, a power request and determine an operating period for the change in power state of the first data storage device, and determining the power change indicator may be further based on the power request and an overshoot configuration.

Another general aspect includes a computer-implemented method that includes: establishing, from a first data storage device, peer communication with a plurality of peer data storage devices, where the first data storage device and each peer data storage device of the plurality of peer data storage devices include a host interface configured to connect to a host system and a control bus interface configured to connect to a control bus; determining, by the first data storage device, a power state of the first data storage device; receiving, through the control bus interface and from a peer data storage device of the plurality of peer data storage devices, a power change indicator; and initiating, responsive to the power change indicator, a change in the power state of the first data storage device.

Implementations may include one or more of the following features. The computer-implemented method may include: determining, from a peer message received through the control bus interface, the power change indicator from a value in a payload of the peer message, where the power change indicator indicates that another peer data storage device of the plurality of peer data storage devices is in a low power state; and increasing, responsive to initiating the change in the power state, the power use of the first data storage device for a predetermined operating period. Increasing the power use of the first data storage device may include entering an overclock range for the first data storage device. The computer-implemented method may include: determining an amount of available power in a power pool corresponding to the plurality of peer data storage devices, where the power change indicator includes the amount of available power for use by the first data storage device; and determining, based on the power change indicator, an increase amount for increasing the power use of the first data storage device, where the increase amount is less than the amount of available power. The computer-implemented method may include sending, from the first data storage device and through the control bus interface, a device power value to at least one data storage device of the plurality of peer data storage devices, where receiving the power change indicator is responsive to sending the device power value. The computer-implemented method may include broadcasting, from the first data storage device and each peer data storage device of the plurality of peer data storage devices, a respective device power value to each other peer data storage device through respective control bus interfaces. The computer-implemented method may include sending, from the first data storage device and through the control bus interface, a power request to at least one peer data storage device of the plurality of peer data storage devices, where receiving the power change indicator is responsive to sending the power request. The computer-implemented method may include: receiving, by a second data storage device in the plurality of peer data storage devices, a corresponding device power value from the first data storage device and each other peer data storage device of the plurality of peer data storage devices; determining, by the second data storage device and based on aggregating device power values, a power pool value for the first data storage device and the plurality of peer data storage devices; determining, by the second data storage device and based on the power pool value, the power change indicator; and sending, from the second data storage device to the first data storage device, the power change indicator. The computer-implemented method may include: receiving, by a second data storage device in the plurality of peer data storage devices and from the first data storage device, a power request, wherein determining the power change indicator is further based on the power request and an overshoot configuration; and determining an operating period for the change in power state of the first data storage device.

Still another general aspect includes a storage system that includes a control bus and a plurality of peer data storage devices, where each peer data storage device of the plurality of peer data storage devices includes: a processor; a memory; a host interface configured to connect to a host system; a control bus interface configured to connect to the control bus; means for establishing, through the control bus interface, peer communication among the plurality of peer data storage devices; means for determining a power state of that peer data storage device; means for receiving, through the control bus interface and from a peer data storage device of the plurality of peer data storage devices, a power change indicator; and means for initiating, responsive to the power change indicator, a change in the power state of that peer data storage device.

The various embodiments advantageously apply the teachings of storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve the management of data storage device power states, such as by using peer messaging over a control bus among storage devices for coordination of power consumption. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
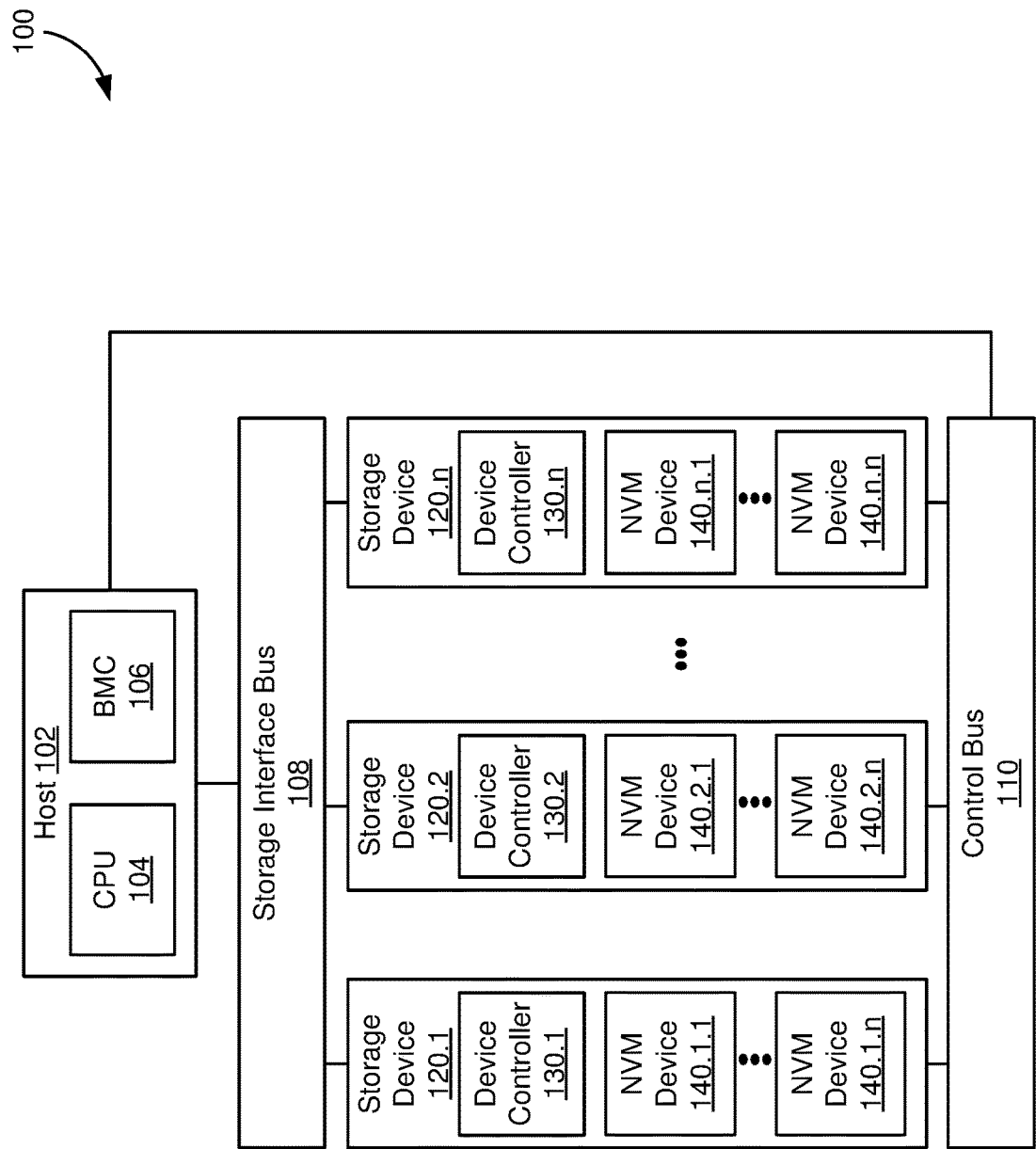
FIG. 1 schematically illustrates a multi-device storage system with a storage interface bus and a control bus.

FIG. 1 shows an embodiment of an example data storage system 100 with data storage devices 120 interconnected by both storage interface bus 108 and control bus 110. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to a common storage interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 102. In some embodiments, storage interface bus 108 may provide the primary host interface for storage device management and host data transfer, and control interface bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, storage devices 120 may be configured for peer communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (I3C), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) for monitoring the physical state of storage devices 120 for host 102. Storage devices 120 may be defined as peer storage devices based on their connection to a shared control bus 110.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, host or host system 102 may be coupled to data storage system 100 through a network interface that is part of host fabric network that includes storage interface bus 108 as a host fabric interface. In some embodiments, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through storage interface bus 108. In some embodiments, CPU 104 may include a processor and be associated with operating memory (not shown) for executing both storage operations and a storage interface protocol compatible with storage interface bus 108 and storage devices 120. In some embodiments, a separate storage interface unit (not shown) may provide the storage interface protocol and related processor and memory resources. From the perspective of storage devices 120, storage interface bus 108 may be referred to as a host interface bus and provides a host data path between storage devices 120 and host 102.

Host system 102 may include a BMC 106 configured to monitor the physical state of host 102, storage devices 120, and/or other components of data storage system 100. In some embodiments, BMC 106 may include processor, memory, sensor, and other resources integrated in BMC 106 and/or accessible over control bus 110. BMC 106 may be configured to measure internal variables within a housing, adjacent components, and/or from the components themselves within host 102 or data storage system 100, such as temperature, humidity, power-supply voltage, fan speeds, communication parameters, and/or operating system (OS) functions. BMC 106 may enable systems and components to be power cycled or rebooted as needed through control signals over control bus 110. In some embodiments, BMC 106 may be configured to receive status communication from storage devices 120 through control bus 110 during boot cycles, prior to initialization of host communication through storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
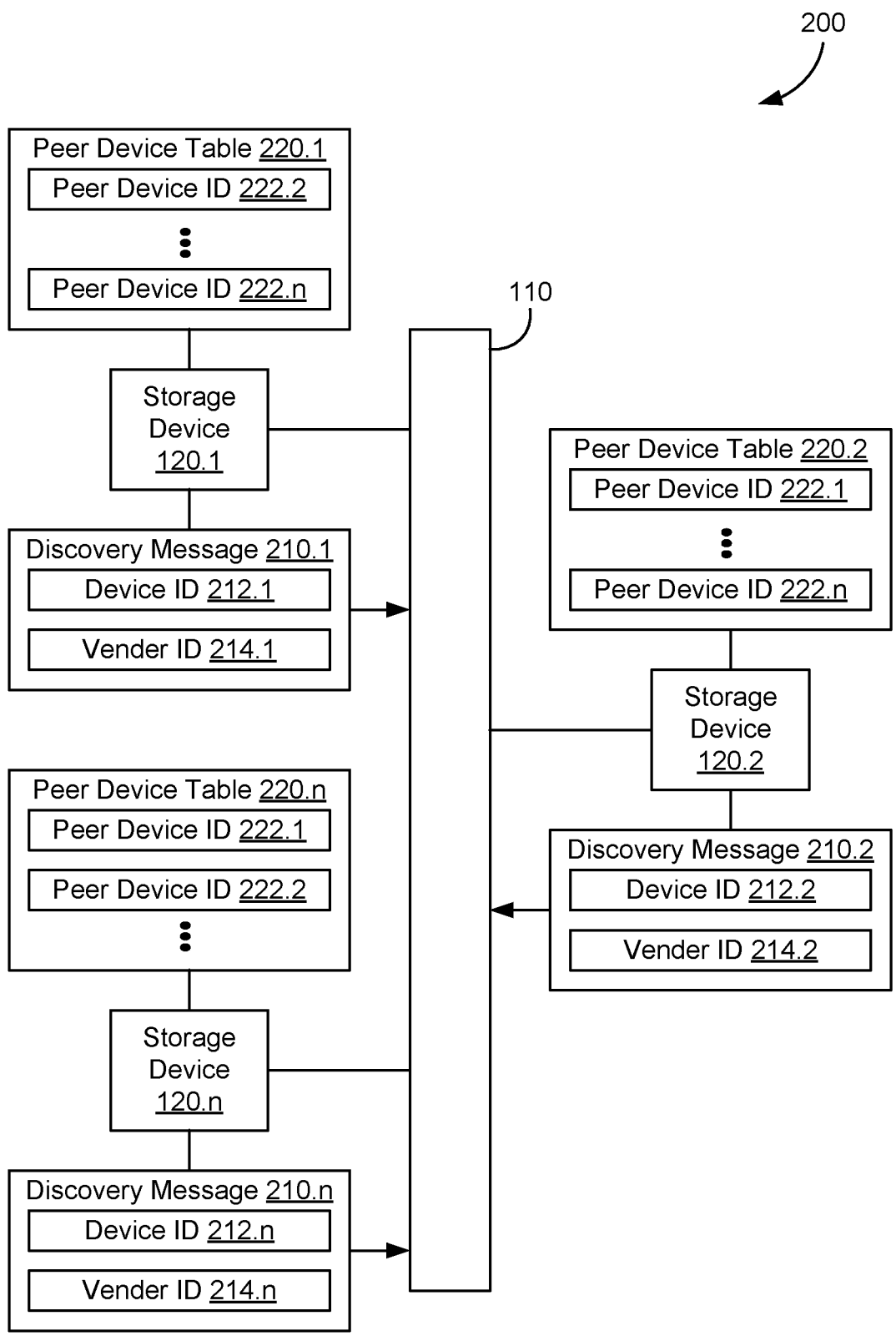
FIG. 2 schematically illustrates a peer discovery architecture that may be used by the multi-device storage system of FIG. 1.

FIG. 2 shows a schematic representation of an example storage system 200, such as multi-device data storage system 100 in FIG. 1, configured with a peer discovery architecture to support peer messaging through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components. Peer messaging through control bus 110 may be independent of any communication through a primary host interface or fabric interface, such as storage interface bus 108 in FIG. 1.

Each peer storage device 120.1-120.n connected to control bus 110 may be configured to initiate a discover message 210. Discovery message 210 may be broadcast to control bus 110 during start up or initialization. For example, storage device 120 may use the control bus protocol to establish priority or temporary master control of control bus 110 and send a broadcast message that is received by all other devices connected to control bus 110. Storage device 120.1 may thereby send discovery message 210.1 to storage devices 120.2-120.n and each peer storage device may do the same in turn during a system initialization, power cycle, or reboot. Each peer storage device 120 connected to control bus 110 may receive a discovery message from each other peer storage device 120.

In some embodiments, discovery message 210 may include a device identifier 212 and a vender identifier 214. Device identifier 212 may include a unique identifier for that storage device relative to all other devices connected to control bus 110. In some embodiments, device identifier 212 may include a product serial number and/or a unique address assigned to the particular storage device. For example, each device connected to control bus 110 may be assigned a 7 bit address that uniquely identifies that device on control bus 110. Messages intended for that storage device will include the address in the message sequence and only the storage device with the matching address will process the content of the message. Messages may also be sent with a reserved broadcast or general call address for the message to be received and processed by all devices.

Vender identifier 214 may include a group identifier that designates storage devices meeting a specific set of criteria, such as storage devices manufactured or sold by a particular company or configured in accordance with a specific peer messaging protocol or standard. For example, vender identifier 214 may include a numeric identifier for storage devices from a specific vendor that are enabled for peer messaging over the control bus. Vendor identifiers may be defined and assigned by particular manufacturers, in accordance with working group or standard agreement, or through other means to assure that vendor identifiers are unique and serve to properly identify storage devices compatible with specific peer messaging protocols and content.

In some embodiments, each storage device 120 may use discovery messages 210 received from peer storage devices to populate an internal data structure for storing the addresses of one or more peer storage devices. For example, each storage device 120 may maintain peer device table 220 in an internal memory location to list the addresses, device identifiers 212, and/or vendor identifiers 214 of each other peer storage device attached to control bus 110. In some embodiments, peer device table 220 may include a series, list, or array, of peer device identifier entries 222. For example, each time a discovery message with a different device identifier 212 is received (and includes a corresponding vendor identifier 214 that denotes the device as a peer storage device for messaging purposes), that device identifier 212 may be entered in peer device table 220 as a new peer device identifier entry 222. After all discovery messages 210 have been received, each storage device 120 may include a complete peer device table 220 with the information necessary to send messages to each other peer storage device over control bus 110.

Figure 3:
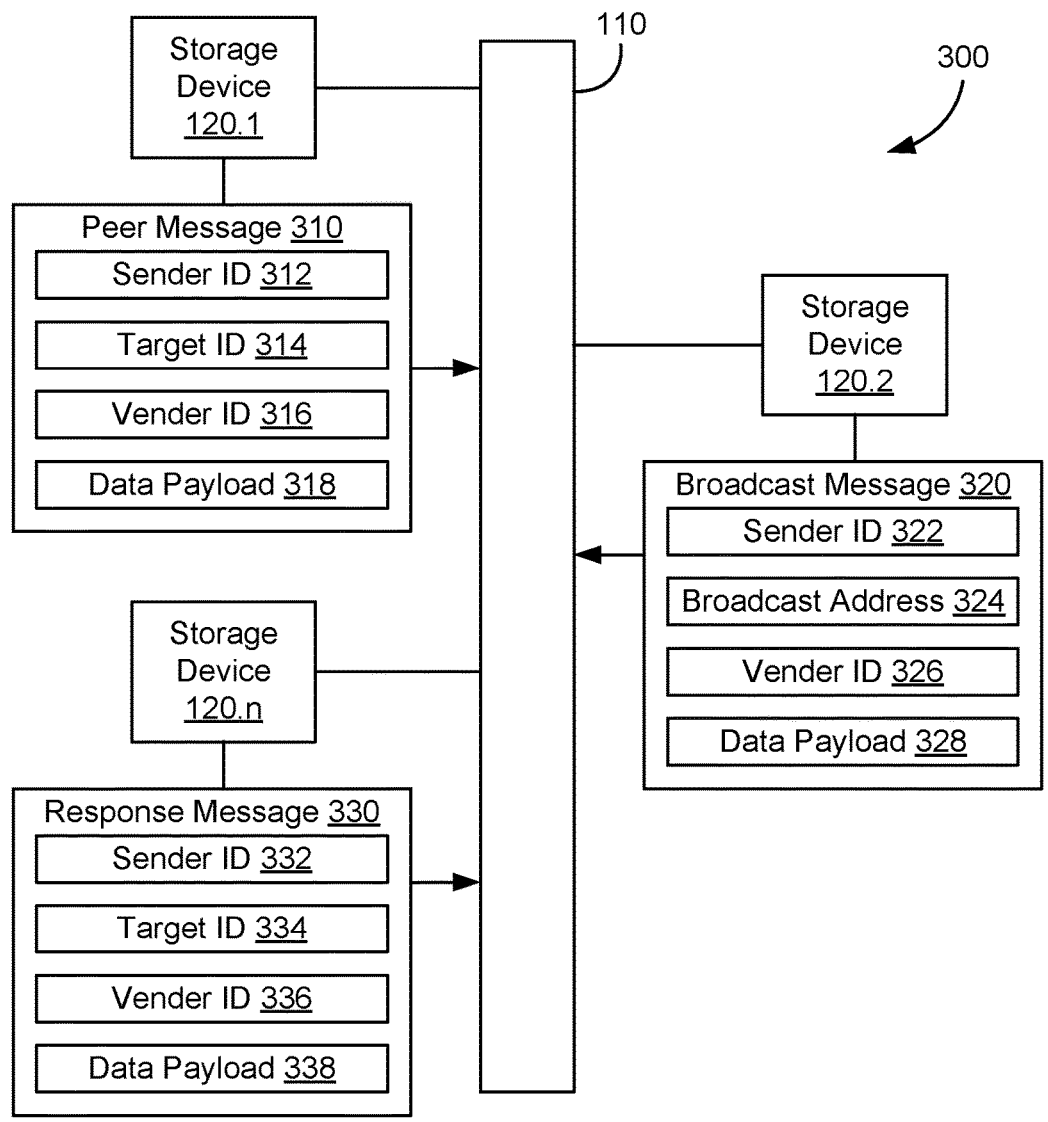
FIG. 3 schematically illustrates a peer messaging architecture that may be used by the multi-device storage system of FIG. 1.

FIG. 3 shows a schematic representation of an example storage system 300, such as multi-device data storage system 100 in FIG. 1, configured with a peer message architecture to support various types of peer messages 310, 320, 330 through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components connected to control bus 110. For example, each storage device may be able to request or assert master control or priority in order to send messages through control bus 110 to peer storage devices operating as slaves. Peer messaging through control bus 110 may be independent of any communication through a primary host interface or fabric interface, such as storage interface bus 108 in FIG. 1.

Each peer storage device 120.1-120.n connected to control bus 110 may be configured to initiate one or more messages 310, 320, 330 using addresses and message syntax supported by control bus 110. While each example message is shown coming from a particular storage device 120, each storage device 120 may be configured to use any or all of the message types. Peer message 310 may be used by storage devices 120 to send direct messages to a target peer storage device, such as a message containing power state information, power requests and/or power change indicators. Broadcast message 320 may be used by storage devices 120 to send messages to all peer storage devices at once, such as a message containing power state information or requesting priority for using available power in a power pool. Response message 330 may be used by storage devices 120 to send messages back to a peer storage device that has requested available power, such as responding to a power request by sending a power change indicator or authorization. Note that response message 330 includes data payload and, in some embodiments, may require the sending storage device to have master control or priority and may be distinguished from simple acknowledgement messages that may be part of the slave's message handling protocol.

In some embodiments, peer message 310 may include a sender identifier 312, a target identifier 314, a vender identifier 316, and a data payload 318. For example, sender identifier 312 may include the device identifier for the sending storage device and/or control bus address of the sending storage device. Target identifier 314 may include the device identifier for the target storage device and/or control bus address of the target storage device. In some embodiments, target identifier 314 may include a device identifier that is separate from the control bus address used by devices on control bus 110 to determine the target device. Vender identifier 316 may include a vender identifier as described above with regard to vender identifiers 214 in FIG. 2. Data payload 318 may include data generated by the sending storage device, such as storage device 120.1, to be used by the target peer storage device for determining changes in power states. For example, data payload 318 may include data related to host power modes, predicted power use, device power states, requests for additional power, and/or power change indicators. In some embodiments, data payload 318 may include a power change indicator to confirm which peer storage devices are changing their power states for a next operating period or update cycle.

In some embodiments, broadcast message 320 may include a sender identifier 322, a broadcast address 324, a vender identifier 326, and a data payload 328. For example, sender identifier 322 may include the device identifier for the sending storage device and/or control bus address of the sending storage device. Broadcast address 324 may include a reserved address, header tag, or similar identifier to denote a broadcast message that should be sent to all devices on control bus 110. Vender identifier 326 may include a vender identifier as described above with regard to vender identifiers 214 in FIG. 2. Data payload 328 may include data generated by the sending storage device, such as storage device 120.1, to be used by one or more peer storage devices. For example, data payload 328 may include power management data, such as host power mode, predicted power use, device power state, a request for additional power, and/or a power change indicator. In some embodiments, data payload 318 may include a power change indicator to confirm which peer storage devices are changing their power states for a next operating period or update cycle.

In some embodiments, response message 330 may include a sender identifier 332, a target identifier 334, a vender identifier 336, and a data payload 338. Response message 330 may differ from peer message 310 in that it may be responsive to receipt of peer message 310. For example, peer message 310 may include a power request for a device with a workload that would benefit from additional power in a next operating period. Sender identifier 332 may include the device identifier for the sending storage device and/or control bus address of the sending storage device. Target identifier 334 may include the device identifier for the target storage device and/or control bus address of the target storage device, generally the storage device from which the recovery request was received. Vender identifier 336 may include a vender identifier as described above with regard to vender identifiers 214 in FIG. 2. Data payload 338 may include a power change indicator to indicate to the requesting storage device that additional power is available and has been allocated (by a collector device or arbitration logic among the peer devices) to the requesting storage device, which may now be the target peer storage device for response message 330. For example, data payload 338 may include an approved change value for the amount of additional power allocated to the requesting storage device.

Figure 4:
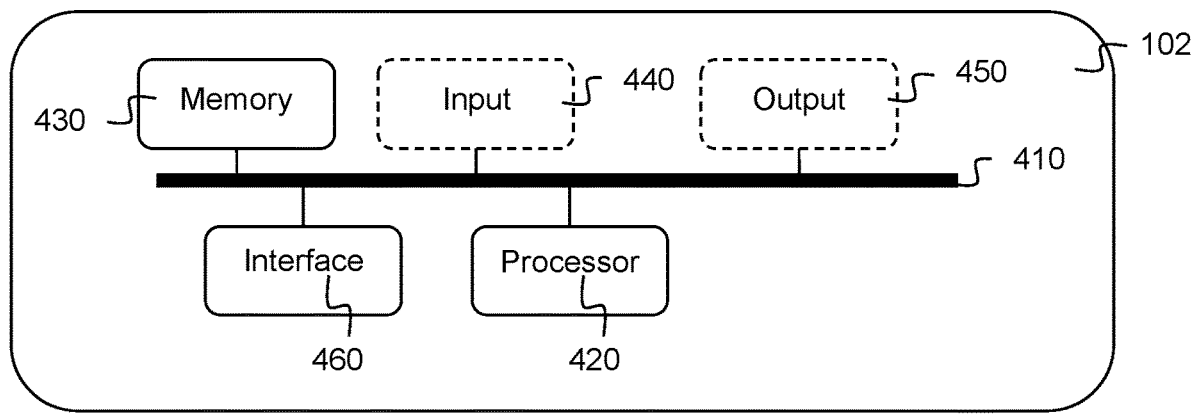
FIG. 4 schematically illustrates a host node of the multi-device storage system of FIG. 1.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe interface for connecting to storage devices 120.

Figure 5:
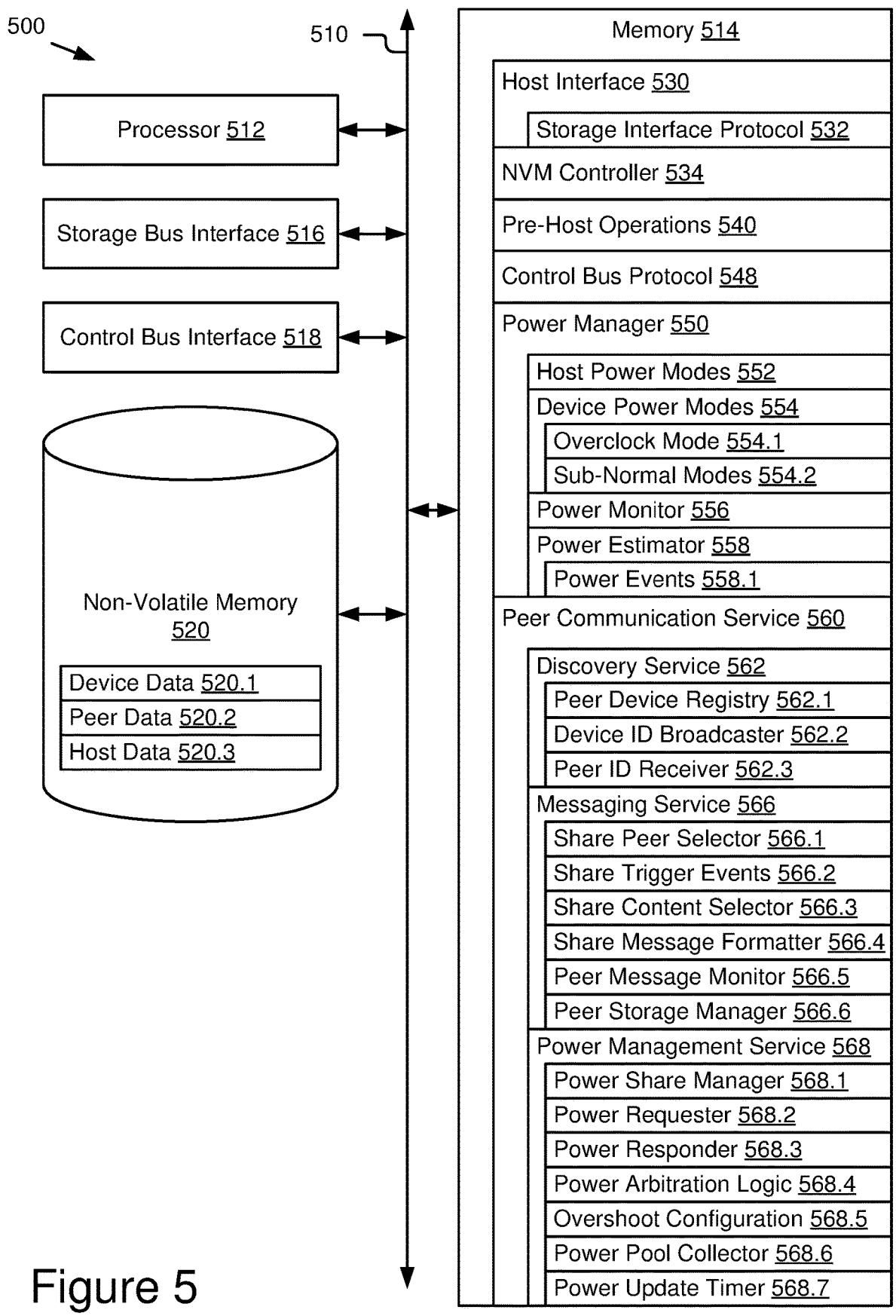
FIG. 5 schematically illustrates some elements of the storage devices of FIGS. 1-4 in more detail.

FIG. 5 schematically shows selected modules of a storage device 500 configured for peer messaging, such as storage devices 120. Storage device 500 may incorporate elements and configurations similar to those shown in FIGS. 1-4. For example, storage device 500 may be configured as a storage device 120 in a set of peer storage devices interconnected by a control bus and including a host or storage bus interface for data transfer to and from a host in a multi-device data storage system.

Storage device 500 may include a bus 510 interconnecting at least one processor 512, at least one memory 514, and at least one interface, such as storage bus interface 516 and control bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disc or a solid state storage element.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example. control bus interface 518 may include a I2C, I3C, SMBus, or similar bus interface connector supporting component-to-component messaging, such as multi-master, packet-based messaging over a two-wire bus.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests from client or host systems. Memory 514 may include a non-volatile memory (NVM) controller 534 configured to manage read and write operations to non-volatile memory devices 520. Memory 514 may include pre-host operations configured for low-level operating system and firmware functions within storage device 500 that are executed independent of host commands, particularly during device power up, initialization, power cycling, or ungraceful shutdown (UGSD). Memory 514 may include a control bus protocol configured manage communication over control bus interface 518 in accordance with a determined protocol or standard. Memory 514 may include power manager 550 configured to manage power states for storage device 500 based on host power modes and actual power use. Memory 514 may include a peer communication service 560 configured for communication among storage devices attached to the same control bus as storage device 500, including a peer power management service 568.

Host interface 530 may include an interface protocol and/or set of functions and parameters for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage bus interface 516 to host data units 520.3 stored in non-volatile memory devices 520. For example, host interface 530 may include host communication protocols compatible with PCIe, SATA, SAS, and/or another bus interface that supports use of NVMe protocols for data access to host data 520.3.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, storage interface protocol 532 may include both PCIe and NVMe compliant communication, command, and syntax functions, procedures, and data structures. In some embodiments, host interface 530 may include additional modules (not shown) for command handling, buffer management, storage device management and reporting, and other host-side functions.

NVM controller 534 may include an interface protocol and/or set of functions and parameters for reading, writing, and deleting data units in non-volatile memory devices 520. For example, host interface 530 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 534 may include flash translation layer (FTL) management, data state machine, read/write buffer management, NVM device interface protocols, NVM device configuration/management/maintenance, and other device-side functions. In some embodiments, NVM controller 534 may be configured to allocate a portion of the memory locations in non-volatile memory devices 520 for storing data other than host data 520.3. For example, NVM controller 534 may allocate device data 520.1 as memory locations reserved for internal device data, including device configuration, parameter, and internal operation data. In some embodiments, NVM controller 534 may allocate peer data 520.2 as memory locations reserved for internal device data received from and about peer storage devices, including internal operation data from those peer storage devices. In some embodiments, storage space allocated to device data 520.1 and/or peer data 520.2 may include device data partitions and/or peer data partitions excluded from the storage capacity made available to host data 520.3, such as overprovisioned storage locations hidden from the host for use storing internal operation data, FTL tables, replacing bad blocks, etc.

Pre-host operations 540 may include functions and parameters for managing low-level device operations for storage device 500. For example, pre-host operations 540 may include operations executed during startup or initialization of storage device 500 prior to establishing host communications through host interface 530, denoted as a pre-host operation state. In some embodiments, pre-host operations 540 may also include functions and parameters for managing low-level device operations during shutdown, power cycle, error, or failure states where host communication may become unavailable temporarily. For example, pre-host operations 540 may include read only memory, boot loader, firmware, and/or operating system operations that govern the basic operation of storage device 500 as a set of interconnected computing components and interfaces, independent of the higher-level host data storage functions.

Control bus protocol 548 may include interfaces, functions, and parameters for communication within the host or an associated baseboard management controller (BMC) using multi-master discovery and messaging compliant with a low-bandwidth interface standard. For example, storage device 500 may be configured for packet-based messaging through control bus interface 518 using a low-bandwidth bus protocol, such as I2C, I3C, SMBus, etc. Control bus protocol 548 may include a plurality of hardware and/or software modules configured to use processor 512, memory 514, and control bus interface 518 for communication with host components, including peer storage devices on the same control bus, using a control bus protocol supported by the connected control bus. In some embodiments, control bus protocol 548 may provide a low-bandwidth communication channel with the host and other system components to assist with power management, discovery, and access to external resources, such as temperature sensors, fan controllers, light emitting diode (LED) indicators, etc. For example, control bus interface 518 may connect storage device 500 to a BMC for monitoring the physical state of storage device 500. In some embodiments, control bus protocol 548 may provide the discovery and messaging functions used by peer communication service 560.

Power manager 550 may include interfaces, functions, parameters, and data structures for managing power use by storage device 500, including the power used by processor 512, memory 514, non-volatile memory 520, and other subsystems. For example, power manager 550 may monitor a power interconnect or interface that provides the power supply for storage device 500 and/or power consumption by onboard electronics and/or motors (for HDDs, tape drives, etc.). In some embodiments, power manager 550 may monitor a power state of storage device 500, which is the amount of power actually being used by the device and may be expressed as average or peak power values for a given operating period, such as a current operating period, past operating period, future operating period, and/or moving window operating period. In some embodiments, power manager 550 may manage power modes, which are predefined ranges of acceptable power use, sometimes defined in terms of acceptable device operations and/or power uses. For example, a normal operating mode may have a defined baseline power and maximum power for the power range that the device may use during normal storage operations, and a low power mode may have a lower baseline power and a maximum power for a power range that suspends normal operations but maintains power to some processor, interface, and memory systems to place the storage device on standby (though some low power modes also allow some amount of background operations by the storage device to perform low power data management and system maintenance tasks). In some embodiments, low power modes may include any power mode (host or device) that does not enable use of the maximum normal power of storage device 500. Power manager 550 may also manage and/or be responsive to power up and power down events.

In some embodiments, power manager 550 may include a plurality of hardware and/or software modules configured to use processor 512 and memory 514 to handle or manage defined operations of power manager 550. For example, power manager 550 may include host power modes 552 configured to provide host control over the power range used by storage device 500 and corresponding available operations. For example, power manager 550 may include device power modes 554 configured for internal management of the power ranges used by storage device 500, which may include more granular control and different ranges than host power modes 552. For example, power manager 550 may include a power monitor 556 configured to monitor the real-time power use of storage device 500 and its subcomponents. For example, power manager 550 may include a power estimator 558 configured to estimate future power use of storage device 500 based on current power use, host command queues, and predicted background operations.

Host power modes 552 may include a host interface protocol and related functions, parameters, and data structures for receiving power mode commands from a host system. For example, host power modes 552 may receive power mode commands through host interface 530 and may use the host power mode to determine the available power range and operations for storage device 500. In some embodiments, host power modes 552 may include a normal operating mode and a low power mode. Host power modes 552 may not be active during device startup, until host communications are established, and may include a soft power down command for initiating device shut down. In some embodiments, power manager 550 may maintain a host power mode parameter in device data 520.1 and the host power mode value may be available to power management service 568.

Device power modes 554 may include internal interfaces, functions, parameters and data structures for managing the actual power state of storage device 500. For example, device power modes may be configured to parallel host power mode 552, such as include a normal operating mode and a low power mode. In some embodiments, device power modes 554 may enable additional power modes that are not available as host power modes. For example, device power modes 554 may include an overclock mode 554.1 and/or divide one or more host power modes into more granular sub-ranges, such as sub-normal modes 554.2. Overclock mode 554.1 may include a power range that extends above the maximum power of the normal power range. For example, overclock mode 554.1 may increase the power to processor 512 and/or other subcomponents to increase processing speed over the specified normal operating range for storage device 500. Sub-normal modes 554.2 may enable power manager 550 to more tightly control the range of actual power use by storage device 500 within the range of a host power mode. For example, sub-normal modes 554.2 may divide the normal operating range defined by the host normal operating mode into two or more sub-ranges, such as a high-power mode (still below overclock mode 554.1) in a higher portion of the normal range and a mid-power mode in a lower portion of the normal range. Each host range may be divided into any number of sub-modes to provide greater internal control to power manager 550, which may enable more effective and efficient coordination of power usage across peer storage devices using power management service 568. In some embodiments, sub-modes may correspond to sub-component power use limits, operation sets, and/or storage operation and/or background operation performance caps. In some embodiments, the power ranges for host power modes 552 and device power modes 554 may be defined in terms of their maximum power limit, while the minimum power limit may be baseline or passive operating power (and may be shared by more than one mode).

Power monitor 556 may include internal interfaces, functions, parameters, and data structures for monitoring the actual power use of storage device 500 during operations. For example, power monitor 556 may be configured to monitor one or more power source interfaces to determine the actual power draw of storage device 500. In some embodiments, power monitor 556 may include more detailed power monitoring for one or more subcomponents of storage device 500. For example, power monitor 556 may monitor storage controller power, non-volatile memory subsystem power, and/or additional subsystems, such as motor power, power to individual memory devices, processors, system-on-a-chip (SOCs), etc. Power monitor 556 may maintain a data structure in operating memory and/or non-volatile memory 520 with current and/or historical power parameter values, such as total device power and/or subsystem power values. Power parameter values from power monitor 556 may be accessed and used by other components of power manager 550 and/or other components, such as power management service 568.

Power estimator 558 may include internal interfaces, functions, parameters, and data structures for predicting future power use during one or more operating periods. For example, power estimator 558 may use current power parameter values from power monitor 556 to extrapolate future use and generate one or more predicted power use values. In some embodiments, power estimator 558 may include a power estimation algorithm that uses a plurality of parameters to predict power use over one or more future operating periods. For example, a statistical model for power use may be based on current power use, historical power use patterns, host command queue, background operation (e.g., garbage collection, wear balancing, memory scan, data migration, etc.) triggers and/or schedule, and/or other factors. Statistical models may also generate a probability value that may evaluated against a reliability threshold value for determining whether a calculated estimate is sufficiently reliable to take action on. In some embodiments, future operating periods may include one or more update cycles used by power management service 568. For example, power estimator 558 may be configured to estimate the likelihood that the current power use will continue for the current update cycle and predicted changes for one or more next update cycles. Power estimates generated by power estimator 558 may include predicted power use values used by power management service 568 to assist in peer allocation of the host power pool as further described below. In some embodiments, power estimator 558 may be configured to identify future operations that correspond to a significant change in the power needs of storage device 500. For example, a storage device may include a schedule for background operations, such as garbage collection, wear-leveling, memory scan, replication, or de-duplication. In some cases, large workloads may be scheduled by a host device, such as data processing tasks (searches, transformations, training, map-reduce functions, etc.) and power estimator 558 may be aware of the future increase in host processing demand. Power estimator 558 may be configured to treat a scheduled future change in processing demand as a power event 558.1. In some embodiments, power events 558.1 may correspond to increases in demand and/or decreases in demand. Power estimator 558 may be configured to provide identifiers (timing and predicted change in power demand) for power events 558.1 to power management service 568 to use in power requests and other operations for coordinating among peer storage devices.

Peer communication service 560 may include an interface protocol and set of functions and parameters for discovering peer storage devices, sending and receiving messages with those peer storage devices, and/or managing power use across those peer storage devices. For example, peer communication service 560 may include functions for utilizing low-bandwidth communications through control bus interface 518 using control bus protocol 548. In some embodiments, peer communication service 560 may include management of peer data 520.2 in non-volatile memory devices 520 for storing peer power use and/or management information to support power management service 568.

In some embodiments, peer communication service 560 may include a plurality of hardware and/or software modules configured to use processor 512 and memory 514 to handle or manage defined operations of peer communication service 560. For example, peer communication service 560 may include a discovery service 562, a messaging service 566, and/or a power management service 568. For example, discovery service 562 may be configured to discover peer storage devices on a shared control bus and store their addresses for use by messaging service 566. Messaging service 566 may be configured to send and receive one-to-one and/or broadcast messages to and from peer storage devices over the shared control bus. Power management service 568 may be configured to request and receive data from peer storage devices through messaging service 566 to assist with power management decisions for storage device 500 and allocation of a shared power pool across peer storage devices.

Discovery service 562 may include data structures, functions, and interfaces for discovering peer devices on a control bus and determining peer device addresses for use by peer communication service 560. For example, during initialization or startup of storage device 500, discovery service 562 may broadcast its device identifier or address and receive similar broadcasts from other devices to accumulate device information for other devices on the control bus. In some embodiments, discovery service 562 may include a peer device registry 562.1 configured to store storage device identifiers, control bus addresses, and/or other peer storage device information to establish and support communication with peer storage devices. For example, peer device registry 562.1 may include a data table or other data structure in memory 514 and/or device data 520.1 that includes a plurality of device identifier entries associated with corresponding control bus addresses. In some embodiments, discovery service 562 may include a device ID broadcaster 562.2 configured to determine the storage device identifier and/or control bus address for storage device 500 and broadcast a message on the control bus to enable other devices on the control bus to discover storage device 500. For example, device ID broadcaster 562.2 may be triggered during ROM, boot loader, or firmware execution at startup or initialization of storage device 500, in response to a discovery message from another device, and/or another device discovery trigger in accordance with control bus protocol 548. In some embodiments, discovery service 562 may include a peer ID receiver 562.3 configured to monitor communications through control bus interface 518, identify discovery broadcasts from other storage devices, and add a corresponding device identifier entry in peer device registry 520.1. For example, control bus protocol 548 may define syntax for broadcast messages, such as a broadcast address, a tag or similar parameter for designating a discovery broadcast, and data payload including the storage device identifier, control bus address, vendor identifier, etc. and peer ID receiver 562.3 may be configured according to parse messages meeting that syntax to extract peer storage device identifiers.

Messaging service 566 may include data structures, functions, and interfaces for sending and receiving messages to and from peer devices over the control bus and may also be referred to as a peer messaging service. For example, messaging service 566 may implement control bus protocol 548 to send and receive messages with other devices identified through discovery service 562. In some embodiments, messaging service 566 may send packetized data payloads over the control bus using block write and block read commands between buffers in the peer storage devices.

In some embodiments, messaging service 566 may include a share peer selector 566.1 configured to select a target or destination peer storage device to receive a message. For example, share peer selector 566.1 may include a parameter setting or algorithm for selecting a peer storage device to receive a particular peer message. In some embodiments, messaging service 566 may include share trigger events 566.2 configured to determine when selected message data is sent to one or more peer storage devices. For example, share trigger events 566.2 may include a plurality of rule-based conditions for triggering notification of power changes to one or more peer storage devices, such as a message to a peer storage device acting as collector for power management decisions or broadcast to all other peer storage devices. In some embodiments, messages or broadcasts of device power information may occur on a regular schedule based around power update timer 568.6, update cycles, and corresponding operating periods. In some embodiments, messaging service 566 may include a share content selector 566.3 configured to select the set of parameters to include in the payload of messaging service 566. For example, share content selector 566.3 may include a set of parameters for determining power parameter data types and ranges to be sent to a peer storage device. In some embodiments, messaging service 566 may include a share message formatter 566.4 configured to format a peer message in accordance with control bus protocol 548 to include the control bus address of the target peer storage device and the selected content in the data payload. For example, share message formatter 566.4 may generate or determine a header containing a control bus address and a read/write flag, followed by message payload and/or other parameters, such as command codes and/or error codes, to convey the selected power management data.

In some embodiments, messaging service 566 may include a peer message monitor 566.5 configured to monitor control bus interface 518 for messages from peer storage devices addressed to storage device 500 (directly or via broadcast). For example, peer message monitor 566.5 may receive peer messages over the control bus that are initiated by peer storage devices and/or responsive to messages sent by messaging service 566. Peer message monitor 566.5 may parse received messages to determine whether further action is necessary, such as passing peer power parameters and/or power requests to peer storage manager 566.6 and/or power management service 568. In some embodiments, messaging service 566 may include a peer storage manager 566.6 configured to store peer data received from peer storage devices for use in power management decision and/or operation of power management service 568. For example, peer storage manager 566.6 may receive power parameter data from one or more peer storage devices and store the data in peer data 520.2.

Power management service 568 may include data structures, functions, and interfaces for participating in a shared power pool for the peer storage devices. For example, power management service 568 may enable storage device 500 to coordinate with peer storage devices through messaging service 566 and control bus interface 518 such that when one device reduces its power usage, such as entering low power mode, other storage devices in the peer group may increase their power usage. The peer group may manage their power states and power modes collectively and without host intervention, while still being responsive to a current configuration of host power modes for each storage device. In some embodiments, one of the peer storage devices may act as power pool collector for collecting power parameter data from the peer group, making power allocation decisions, and notifying peer storage devices of approved power changes. In some embodiments, each peer storage device may collect power parameter data from each other peer storage device and evaluate a set of power arbitration rules to determine whether to change power use (and communicate that change to the peer group).

In some embodiments, power management service 568 may include power share manager 568.1 configured to manage a power sharing configuration for storage device 500. For example, power share manager 568.1 may include a set of configuration parameters defining what power parameter data is shared, trigger conditions for sharing, request/response protocol parameters, broadcast parameters, arbitration rule sets (including overshoot configuration), update timing parameters and operating periods, and/or designation of one of the peer group as power pool collector or lead. Power share manager 568.1 may enable a system administrator to configure power management service 568.1, such as through a configuration file or interface.

Power share manager 568.1 may define and/or initiate one or more functions of messaging service 566 to support the functions of power management service 568. For example, power share manager 568.1 may use peer messages and/or broadcasts with power parameters and indicators to share power information among the peer group. Power share manager 568.1 may also include, request, or otherwise access power parameter data generated and/or managed by power manager 550, such as power modes, current power state information, and power estimates, for use by power management service 568. In some embodiments, power share manager 568.1 may receive power parameter data from the peer storage devices (through messaging service 566) and aggregate and store that data for use in power management decisions, including changing device power modes, power requests, power responses, evaluation of arbitration rules, etc.

In some embodiments, power management service 568 may support a request/response protocol for changes in the power modes of peer storage devices. For example, power management service 568 may include a power requester 568.2 for requesting a change in power available to storage device 500 and a power responder 568.3 for responding to changes and/or requests from other storage devices in the peer group. Power requester 568.2 may be configured to send a request for additional power allocation to the peer group and/or a peer in the collector role. For example, if storage device 500 is currently maximizing the available power for its current power mode (host and/or device power mode) and has host storage operation and/or background operation demands that would benefit from additional power, power requester 568.2 may notify the peer group or collector that it could use more power. In some configurations, a power request may be made responsive to another peer storage device going into a lower power mode and unused power being available in the power pool. For example, when one storage device goes into low power mode it may generate an amount of available power and the peer storage devices may use power requester 568.2 to indicate to the other storage devices that the peer storage device would like to use the available power or a portion thereof. Note that power requests may be made when no unallocated power appears to be available in the power pool and may enable one or more peer storage devices to reduce their power to allow the requester to increase their power. Power requester 568.2 may be configured to generate power requests based on power events 558.1 that have not yet occurred. For example, power requester 568.2 may generate a power request message one or more update cycles before a scheduled power event 558.1 in order to resolve reallocation of power in the power pool prior to the scheduled event. Power responder 568.3 may be configured to respond to power requests. For example, power responder 568.3 may enable peer storage devices to indicate that a proposed power change, such as the device requesting power increasing their power use for an agreed operating period, is acceptable and the power pool is being reallocated accordingly. In some embodiments, each storage device in the peer group responds to each power request and the requesting device waits for responses with affirmative power change indicators from all other devices before initiating the change in power mode. In some embodiments, only the power pool collector responds to the power request. For example, each storage device may direct power requests to the power pool collector and the power pool collector may make the power allocation decisions and send responses through power responder 568.3.

In some embodiments, power management service 568 may include power arbitration logic 568.4 configured to determine how power in the power pool is allocated among the peer group. For example, power arbitration logic 568.4 may evaluate a set of power arbitration rules responsive to a change in the power use of one or more storage devices and/or a request for a change in power use by one or more storage devices. In some embodiments, power arbitration logic 568.4 may be based on distributed decision-making where each storage device is configured with a set of logical rules that it can evaluate to determine whether it can change its power mode based on the current or proposed power states of the other storage devices (based on the power parameter data provided by those devices through power share manager 568.1). For example, when one device goes to a low power mode and results in available power in the power pool, each other storage device may immediately increase their power use based on an equal share of the available power. More complex arbitration rules may allow different storage devices to take or leave allocations, such as through a series of operating periods and update cycles. For example, in a first update cycle, those storage devices that have an increased power need (according to the estimates of power manager 550) may take their pro rata share of the available power and notify the other devices of the changed power state. In the next update cycle, the devices that increased their power may take additional allocation based on any devices that did not use their available share. In some embodiments, power arbitration logic 568.4 may include rules giving power priority to power events 558.1 and trigger other storage devices to reduce power use to provide additional power for the scheduled power event. In some embodiments, power arbitration logic 568.4 may include self-assessment logic that looks at current power use (from power monitor 556) and/or predicted power use (from power estimator 558) to enable storage devices to lower their power use to support increased use by other storage devices in the peer power pool. Such power reductions may be triggered by power requests from other storage devices and/or may be provided in power updates as each storage device seeks maximize the efficiency of the power use. For example, each storage device may select a device power mode 554 (e.g., sub-normal modes 554.2) that allows it to meet host performance goals for its current and/or estimated workload and provide that power information in power updates and/or power change indicators. In some embodiments, a storage device with the power pool collector role may use power arbitration logic 568.4 to make allocations for all of the other peer devices in response to a change or request from any storage device in the peer group (including itself).

In some embodiments, power arbitration logic 568.4 may include a subset of rules for managing overshoot conditions, representing overshoot configuration 568.5. Overshoot configuration 568.5 may include timing, notification, and/or available margin in the allocation of the power pool to assure that the power pool is not overdrawn. Overshoot configuration 568.5 may be configured to assure that the power pool maximum is not exceeded by the aggregate power use of the storage devices in the power pool. Example overshoot configurations may include, update cycle delays between notification of a proposed power change prior to implementing that change by any device, margin in the allocation of available power that assures that a storage device increasing power state (by some allowable amount) does not exceed the power pool maximum, and/or other controls for preventing aggregate power overshoot.

In some embodiments, storage device 500 may be configured as power pool collector 568.6 for the peer group. As described above, power pool collector 568.6 may be configured for a group leader role for power management that uses power share manager 568.1, power requester 568.2, power responder 568.3, and power arbitration logic 568.4 to provide a centralized resource for collecting power parameter data from the other storage devices, identifying power changes and/or requested or proposed power changes, make power allocation decisions for the aggregate power pool, and notify the other storage devices of acceptable power changes, through power change indicators. In some embodiments, power pool collector 568.6 makes power change decisions and send each other storage device a power change indicator reflecting the changed allocations and defining at least a minimum operating period during which the configuration of power modes will be used. For example, power pool collector 568.6 may inform each storage device of a device power mode that should be used during the next operating period.

In some embodiments, power management service 568 may operate based on a power update timer 568.7 configured to coordinate across storage devices on a cycle of predetermined operating periods. For example, power update timer 568.7 may trigger each device to provide updated power parameter data, such as power state information, and/or provide an opportunity for new power requests. Power update timer 568.7 may be used in configurations with decentralized power arbitration or using power pool collector 568.6. In some embodiments, power management service 568 may be event driven (such as responsive to changes in host power modes) and power update timer 568.7 may be used for a limited number of cycles necessary to evaluate arbitration logic and resolve any related requests and responses.

Figure 6:
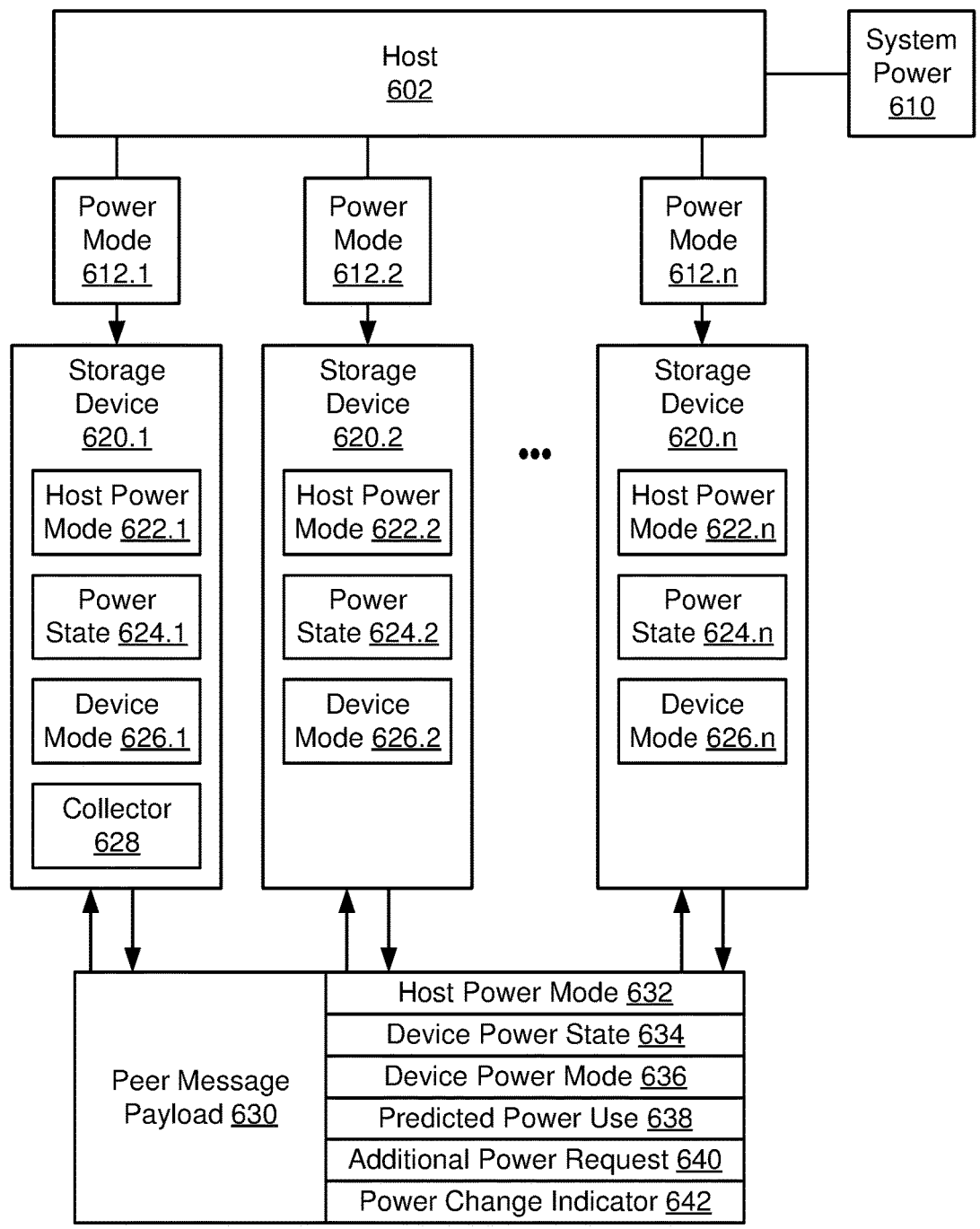
FIG. 6 schematically illustrates an example power management configuration for the storage devices of FIGS. 1-5.

FIG. 6 shows a storage system 600 configured for peer power management using peer messaging, such as through a control bus interface. For example, storage system 600 may include configurations of hosts and storage devices as described above for FIGS. 1-5. Host 602 may be configured to manage system power 610 provided to storage devices 620.1-620.n. In some embodiments, system power 610 may be provided to storage devices 620 through host 602. For example, power interconnects may be part of the physical interface between host 602 and storage devices 620. In some embodiments, system power 610 may be provided by a power module that connects to storage device 620 (and host 602) and may or may not enable some level of host control over power provided to storage devices 620. In some embodiments, host control of storage device power may be limited to host power modes 612.1-612.n set by host 602 for each storage device 620. For example, host 602 may initiate power up or power down of any storage device 620 and determine whether powered up devices are operating in normal operating mode or low power mode. During operation, host 602 may also periodically change host power modes for the storage devices, such as commanding a storage device in normal power mode to enter low power mode or a device in low power mode to return to normal power mode. For example, host 602 may place storage devices in low power mode when it does not need them for host storage operations and place them in normal operating mode when it does need them for host storage operations.

As described with regard to FIGS. 1-5, storage devices 620 may use peer messaging to coordinate power management among them and treat system power 610 available to them as a common power pool. More specifically, they may allocate system power 610 among them in varying amounts depending on the processing needs of each specific device, such as allocating a portion of the power that is not being used by a device in low power mode to assist other devices, perhaps even allowing a storage device with heavy processing demands to overclock (draw more power and increase processor clock rates over the normal operating clock rates) and improve processing performance for a limited operating period.

Storage devices 620 each include a host power mode 622 that is determined by host 602. However, each storage device 620 also has an actual power state 624 that reflects the actual power usage of that storage device at any given time. The actual power state 624 should generally be within the operating power range of host power mode 622, but may vary depending on the workload and processing needs of the storage device at that time. As discussed above, storage devices 620 may also be configured with device power modes 626 that allow each storage device to control their operating power range within (and sometimes around) host power modes 622. In some embodiments, storage devices 620 may be configured to change their device power modes 626 to change their power use to better support their actual processing needs and/or respond to the processing needs of their peer storage devices.

Figure 7:
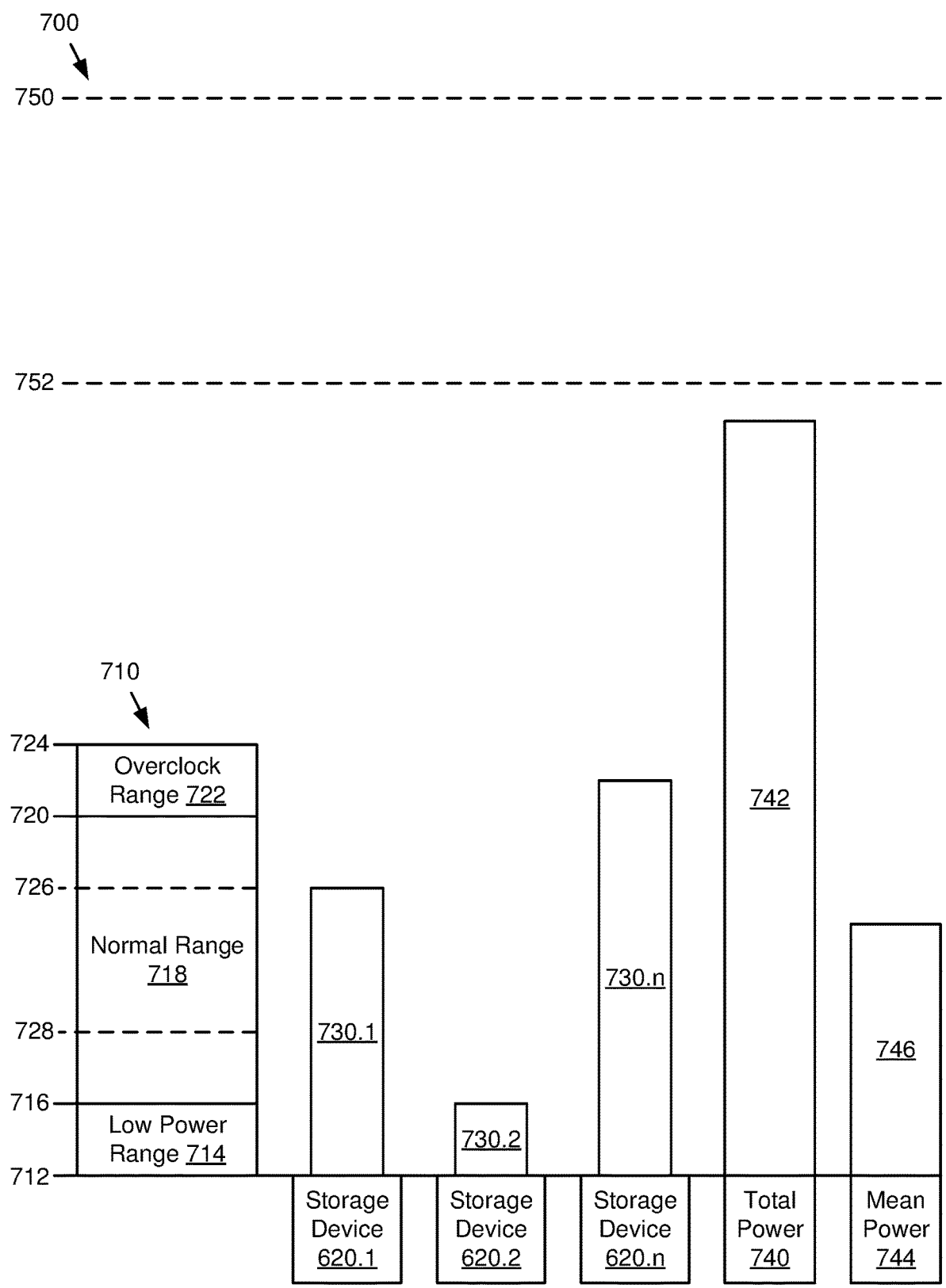
FIG. 7 shows example power use for the storage devices of FIGS. 1-6.

Storage devices 620 may treat the power available to all storage devices in the peer group as a common power pool (as will be further explained with regard to FIG. 7). In some embodiments, they may use peer messaging to allocate power from the power pool among them. Allowing some storage devices to use more power and others to use less power during any given operating period, as long as it remains within the total system power allocated to the storage devices as a group. In some configurations, storage devices 620 may be configured for decentralized decision-making regarding their respective power modes based on sharing power parameter data among them and evaluating it based on a set of power arbitration rules. In the configuration shown, storage device 620.1 has been configured with power pool collector 628 and acts as the group leader for coordinating power management decisions. In either configuration, storage devices 620 share power parameter data and power change requests and decisions via peer messaging.

The mechanics of peer messaging are described above. Each peer message, whether request, response, or broadcast, may include peer message payload 630 including one or more parameter values for conveying power management information. Each storage device 620 may send messages with peer message payload 630 reflecting their own power parameters, power needs, and power decisions. Note that the payload parameters shown in FIG. 6 are examples only. Not all parameters may be included in every message, and other parameters and/or sets of parameters for power management may be used beyond those shown. Host power mode 632 may be a device power value that indicates the current host power mode 622 and reflects the host power mode command 612 received by that storage device. For example, host power mode 632 may include a flag, code, or other indicator value indicating normal operating mode or low power mode. Device power state 634 may be a device power value that indicates the current power actually being used by that storage device. For example, device power state 634 may include a numeric average or peak power value for the storage device during a most recent operating period. Device power mode 636 may be a device power value that indicates a current device operating power range (in a device that includes additional power modes beyond the host power modes, such as overclock modes or sub-modes). For example, device power mode 636 may include a flag, code, or other indicator for a device power mode, such as overclock mode. Predicted power use 638 may be a device power value that indicates an expected operating power in a next operating period. For example, predicted power use 638 may include a numeric estimated average or peak power value and/or an indicator of predicted power delta (increase, decrease, amount of change, etc.) for a next or other future operating period. Additional device power values generated by the power manager of the storage device and reflecting the power parameters of that device may also be included in peer message payload 630.

Peer message payload 630 may include one or more decision parameters indicating peer coordination on allocating the power pool. For example, peer message payload 630 may include additional power request 640 and power change indicator 642 to enable peer storage devices to communicate regarding power changes. Additional power request 640 may include an indicator value that a storage device could use more power, if available. For example, additional power request 640 may include a flag, code, or numeric value that indicates a power request and/or quantifies the amount of power being requested. Power change indicator 642 may include an indicator value for arbitrating and/or confirming a power change. For example, when a power mode is changed by the host, a power change indicator value may be provided unilaterally to notify other storage devices that a change in the available power pool is occurring. If the power mode is reducing power use, other storage devices may respond to the newly available power with a power request. If the new power mode is increasing power use, other storage devices may respond be reducing their power use (or device power mode), such as releasing previously allocated extra power. In another example, peer storage devices and/or the power pool collector may respond to additional power request 640 with a flag, code, or other indicator that is an affirmation that a proposed power change is acceptable (and the other devices have been notified) and/or may include a numeric authorization value of the amount of power change approved. Other configurations of power management decision parameters passed between storage devices are also possible to assist in the allocation of the shared power pool.

FIG. 7 shows a graph describing storage device power ranges 710 and how they may be allocated and managed as a collective power pool. For example, storage devices 620.1-620.n from FIG. 6 may be configured as a peer group sharing a common power pool that is dynamically allocated among them using peer messaging. Each storage device 620 may operate in power range 710, which starts at powered off 712 and extends to a maximum overclock power 724. In the example shown, a low power mode may operate in low power range 714, from powered off 712 to a maximum low power threshold 716. When a host assigns a storage device to low power mode, the host expects the storage device power consumption to be below maximum low power threshold 716. The normal operating mode may operate in normal range 718, from maximum low power threshold 716 to maximum normal power threshold 720. In some embodiments, storage devices 620 may also be configured to operate in a overclock range 722 that is above the specified maximum normal power threshold 720 and extends to maximum overclock power 724. In some embodiments, storage devices 620 may be configured to manage device power modes that include sub-modes. For example, normal range 718 may be divided into three sub-ranges, from maximum normal power threshold 720 to a first reduced normal power threshold 726, from the first reduced normal power threshold 726 to a second reduced normal power threshold 728, and from the second reduced normal power threshold 728 to maximum low power threshold 716.

At any given time, each storage device 620 may be operating in a power state corresponding to an actual power value within one or more ranges. Each storage device 620 may also be operating in a host power mode corresponding to one of the host power ranges and/or a device power mode corresponding to a power range and/or sub-range. For example, storage device 620.1 may be operating in a normal power mode as a host power mode and operating in a device power mode corresponding to first reduced normal power threshold 726 and have a power state 730.1 corresponding to first reduced normal power threshold 726. Storage device 620.2 may be operating in a low power mode as both a host power mode and device power mode and have power state 730.2 of maximum low power threshold 716. Storage device 620.n may be operating in overclock range 722, despite having a normal power mode for a host operating mode. Storage device 620.n may be in an overclock mode for a device operating mode and may have a power state 730.n in the middle of overclock range 722. The power states 730 shown may correspond to a use case of power pooling where storage device 720.2 entered a low power mode and notified the peer group (or power pool collector), resulting in storage device 620.n requesting additional power and the peer storage devices (or power pool collector) authorizing overclock range 722 by sending storage device 620.n appropriate power change indicators.

Power pool allocation decisions (using power arbitration logic 568.4) may be based on aggregate power metrics across the peer group. For example, the power pool may compare aggregate values to a maximum normal power pool value 750 for the peer group, which corresponds to the power use if all storage devices were operating at maximum normal power threshold 720 (e.g., number of storage devices in the peer group times maximum normal power threshold 720). In some embodiments, the allocation decisions may adjust the maximum power pool value to a reduced maximum power pool value 752 where the host expects the reduced power use of placing storage devices in low power mode (e.g., storage device 620.2) to be maintained. Allocation decisions may be based on calculating a total power 740 for the current operating modes and/or power states by aggregating power values (range maximum or power state) across the power pool in power value 742. Allocation decisions may also be based on calculating a mean power 744 by dividing power value 742 by the number of storage devices in the peer group.

Figure 8:
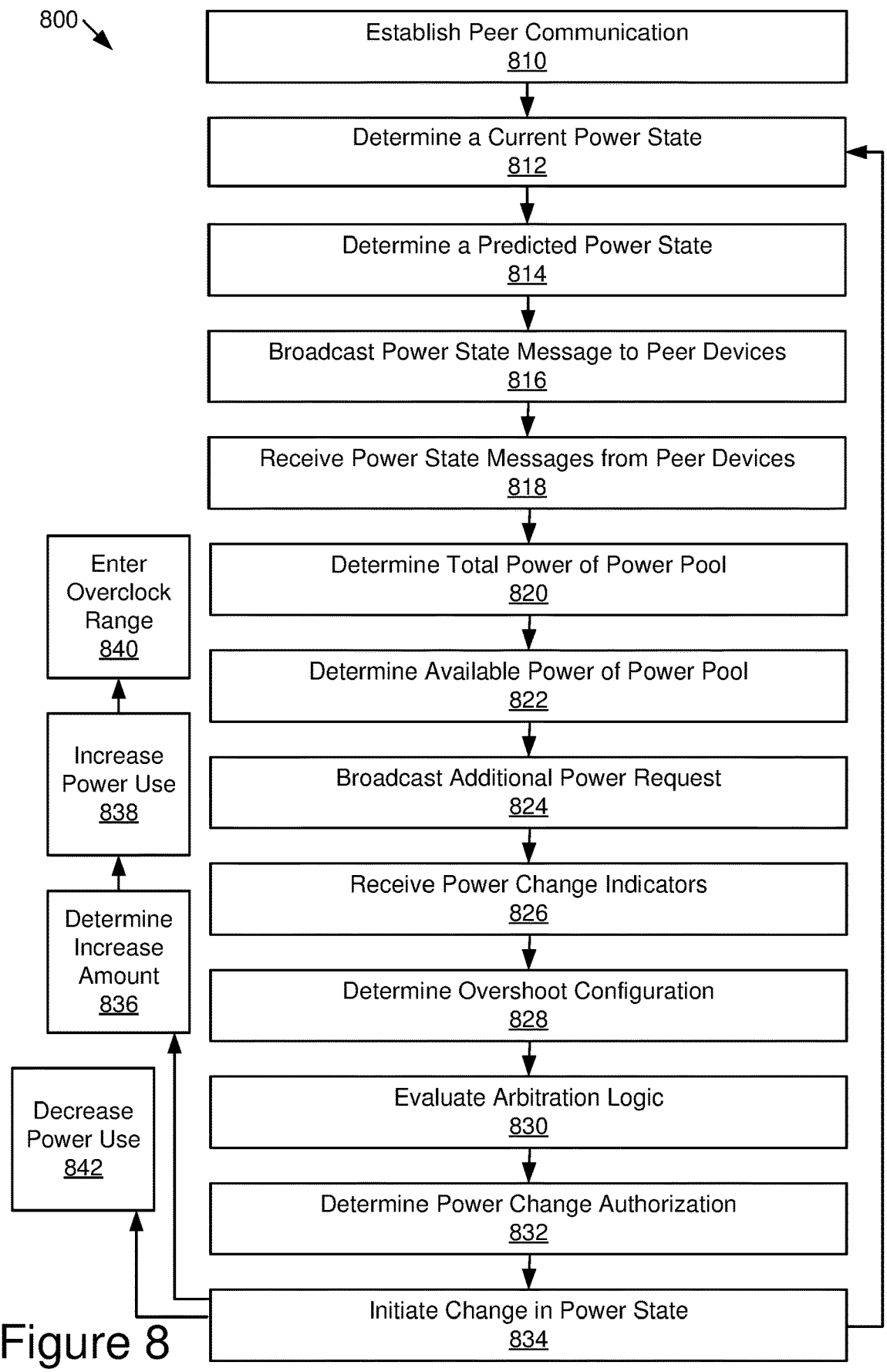
FIG. 8 is a flowchart of an example method of peer power management without a power pool collector role.

As shown in FIG. 8, storage device 500 may be operated according to an example method for peer power management without a power pool collector role, i.e., according to method 800 illustrated by blocks 810-842 in FIG. 8.

At block 810, peer communication may be established over a control bus. For example, a discovery service complying with the control bus protocol may initiate communications among the peer storage devices in a peer group.

At block 812, a current power state may be determined. For example, a power manager may determine the current power use of the storage device.

At block 814, a predicted power state may be determined. For example, the power manager may determine predicted power use for a future operating period.

At block 816, a power state message may be broadcast to peer storage devices. For example, a messaging service may be used by a power management service to broadcast device power values in the payload of a broadcast message to the other storage devices.

At block 818, power state messages may be received from peer storage devices. For example, the messaging service may receive the broadcast messages from the other storage devices and the power management service may parse the corresponding device power values from the payloads, and store them for use in making power allocation decisions.

At block 820, a total power of the power pool may be determined. For example, the power management service may aggregate the power states and/or maximum values of the device power modes to determine how much power is currently being used across all storage devices in the power pool.

At block 822, available power in the power pool may be determined. For example, the power management service may subtract the current power allocation (total power from block 820) from a baseline power available to the power pool (based on maximum normal power for each storage device) to determine available power.

At block 824, an additional power request may be broadcast. For example, the power manager may determine that the performance of the storage device could be improved by increased power and unused power may be available (from block 822), and the power management service may broadcast a corresponding power request to the peer storage devices, which, in some embodiments, may be included as part of a next update cycle. In some embodiments, power requests may also be broadcast even if no additional power appears to be available.

At block 826, power change indicators may be received from peer storage devices. For example, the power management service may wait an update cycle for messages from other storage devices and determine power change indicators in the messages that indicate power changes that may prevent or affirm the requested power change. In some embodiments, power change indicators may be included in the next update cycle from the other storage devices or may be responsive to the additional power request at block 824.

At block 828, an overshoot configuration may be determined. For example, the power management service may be configured with a set of power arbitration rules that include overshoot configuration rules to prevent power overshoot in arbitrating competing additional power requests.

At block 830, arbitration logic may be evaluated. For example, the power management service may apply arbitration rules to the total power, available power, and received power change indicators, in light of the power change indicated in the additional power request of block 824.

At block 832, power change authorization may be determined. For example, evaluation of the arbitration rules and the messages from the other storage devices may cause the power management service to determine that power change authorization has been received for the power change indicator provided in the additional power request.

At block 834, a change in power state may be initiated. For example, the power management service may notify the power manager that a power change has been approved and the amount or mode of the power change authorized.

At block 836, an increase amount may be determined. For example, the power manager may determine a new power threshold based on an authorized power amount or a higher device power mode.

At block 838, power use may be increased. For example, the power manager may initiate the new power threshold and increase the type and/or volume of operations processed and the corresponding power resources available to processors and other components in the storage device.

At block 840, in some configurations, an overclock range may be entered. For example, the power manager may enable an overclock mode allowing processing resources to operate at higher than their normal maximum clock rate.

At block 842, power use may be decreased. For example, the power management service may determine from the arbitration logic that the authorized power change requires a decrease in power use and notify the power manager to decrease power use according to a new, lower power threshold (and/or corresponding mode).

Figure 9:
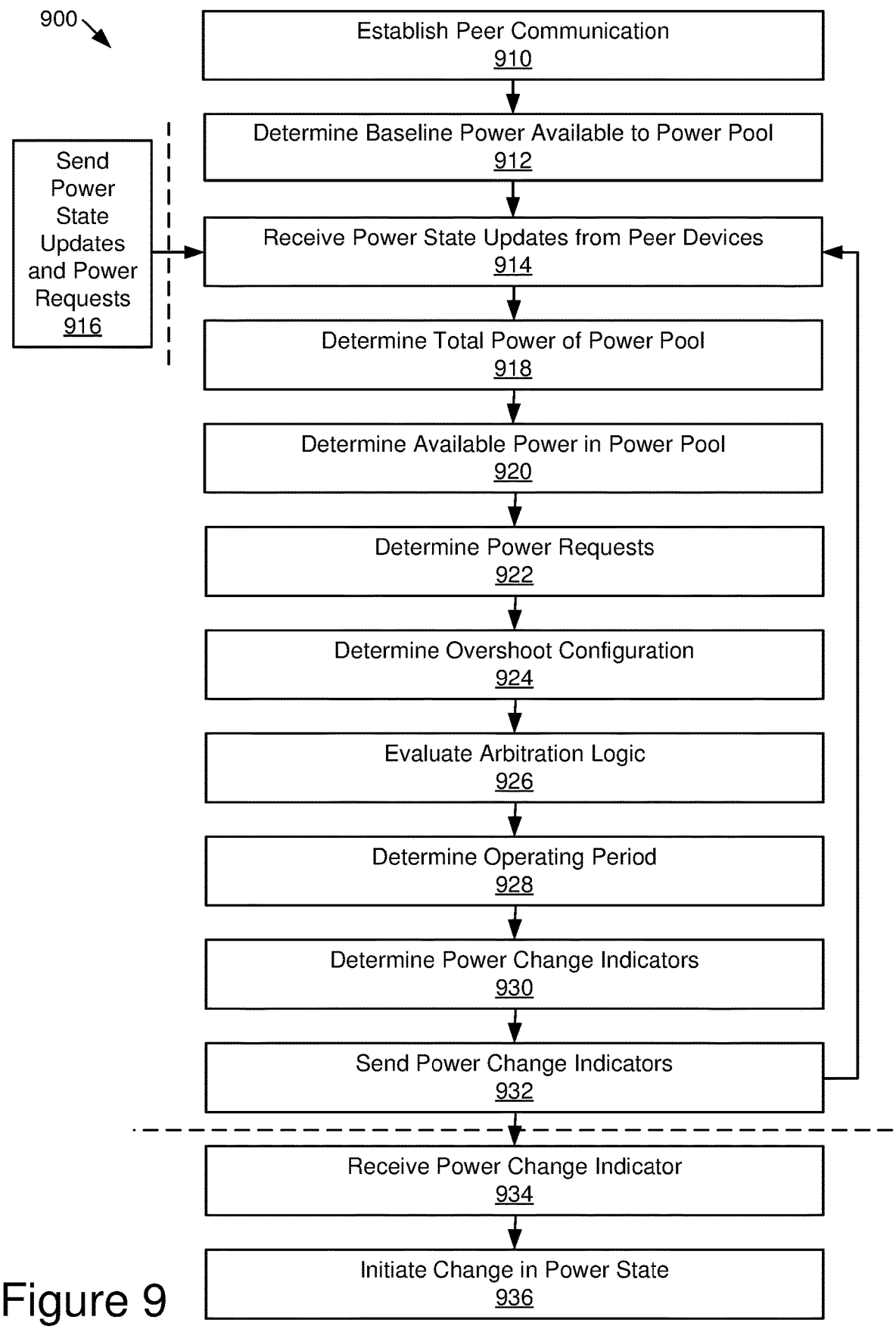
FIG. 9 is a flowchart of an example method of peer power management with a power pool collector role.

As shown in FIG. 9, storage device 500 may be operated according to an example method for peer power management with a power pool collector role, i.e., according to method 900 illustrated by blocks 910-936 in FIG. 9.

At block 910, peer communication may be established over a control bus. For example, a discovery service complying with the control bus protocol may initiate communications among the peer storage devices in a peer group.

At block 912, baseline power available to a power pool may be determined. For example, a peer storage device designated as power pool collector may determine the total power available to all storage devices in the peer group based on their maximum normal operating power and/or current host power modes.

At block 914, power state updates may be received from peer storage devices. For example, the power pool collector may receive broadcast or direct messages from each storage device containing device power values for the corresponding storage devices (and collect similar information from its own power manager). In some embodiments, power state updates may include power requests and/or power requests may be received separately (and determined at block 922). At block 916, the power state updates and/or power requests were sent by the respective storage devices.

At block 918, a total power of the power pool may be determined. For example, the power pool collector may aggregate the power states and/or maximum values of the device power modes from the power state updates of each peer storage device to determine how much power is currently being used across all storage devices in the power pool.

At block 920, available power in the power pool may be determined. For example, the power pool collector may and subtract the current allocation of total power from the baseline power available for the power pool (from block 912) to determine available power.

At block 922, power requests may be determined. For example, the power pool collector may determine that one or more storage devices have a predicted power state representing a power change and/or include explicit requests for additional power allocations in their power state updates.

At block 924, an overshoot configuration may be determined. For example, the power pool collector may be configured with a set of power arbitration rules that include overshoot configuration rules to prevent power overshoot in arbitrating competing additional power requests.

At block 926, arbitration logic may be evaluated. For example, the power pool collector may apply power arbitration rules to the total power, available power, and power state updates, in light of any power changes indicated in the power requests of block 922 to determine the power allocation to each storage device for a next operating period.

At block 928, an operating period may be determined. For example, the power pool collector may use one or more update cycles and/or other logic for determining an approved operating period of the new power allocation determined at block 926.

At block 930, power change indicators may be determined for each storage device that is changing power state. For example, the power pool collector may generate power change indicator corresponding to the amount of power being increased or decreased to each device and/or corresponding changes in power modes.

At block 932, the power change indicators may be sent to respective storage devices. For example, the power pool collector may send the power change indicators determined at block 930 using direct messaging and/or broadcast.

At block 934, each storage device may receive its power change indicator from the power pool collector. At block 936, each storage device receiving a power change indicator may initiate the corresponding change in power state and/or power mode. The power pool collector may send or receive a power change indicator for its own power state, but may provide a notification to its power manager to initiate the corresponding change.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first data storage device comprising:
 a processor;
 a memory;
 a host interface configured to connect to a host system;
 a control bus interface configured to connect to a control bus, wherein a plurality of peer data storage devices is configured to connect to the control bus;
 a power manager configured to determine a power state of the first data storage device;
 a peer messaging service configured to establish, through the control bus interface, peer communication with the plurality of peer data storage devices; and
 a peer power management service configured to:
  receive, through the peer messaging service, a power change indicator; and
  initiate, responsive to the power change indicator, a change in the power state of the first data storage device.

2. The system of claim 1, wherein:
the power change indicator is configured as a value in a payload of a peer message that indicates that another peer data storage device of the plurality of peer data storage devices is in a low power state; and
the power manager is further configured to increase, responsive to the initiated change in the power state, the power use of the first data storage device.

3. The system of claim 2, wherein increasing the power use of the first data storage device includes entering an overclock range for the first data storage device.

4. The system of claim 2, wherein:
the power change indicator includes an amount of available power in a power pool corresponding to the plurality of peer data storage devices; and
increasing the power use of the first data storage device is based on the amount of available power in the power pool.

5. The system of claim 1, wherein:
the peer power management service is further configured to send, through the peer messaging service, a device power value to at least one data storage device of the plurality of peer data storage devices; and the peer messaging service is further configured to receive the power change indicator responsive to sending the device power value.

6. The system of claim 5, wherein the first data storage device and each peer data storage device in the plurality of peer data storage devices is configured to broadcast, through the peer messaging service, a respective device power value to each other peer data storage device.

7. The system of claim 5, wherein the device power value includes at least one value selected from:
a host power mode;
a predicted power use value; and
a device power state.

8. The system of claim 1, wherein:
the peer power management service is further configured to send, through the peer messaging service, a power request to at least one peer storage device of the plurality of peer data storage devices; and
the peer messaging service is further configured to receive the power change indicator responsive to sending the power request.

9. The system of claim 1, further comprising the plurality of peer data storage devices, wherein:
a second data storage device of the plurality of peer data storage devices includes a power pool collector; and
the power pool collector is configured to:
receive, from the first data storage device and each other peer storage device of the plurality of peer storage devices, a corresponding device power value;
determine, based on aggregating device power values, a power pool value for the first data storage device and the plurality of peer data storage devices;
determine, based on the power pool value, the power change indicator; and
send, to the first data storage device, the power change indicator.

10. The system of claim 9, wherein:
the power pool collector is further configured to:
receive, from the first data storage device, a power request; and
determine an operating period for the change in power state of the first data storage device; and
determining the power change indicator is further based on the power request and an overshoot configuration.

11. A computer-implemented method, comprising:
establishing, from a first data storage device, peer communication with a plurality of peer data storage devices, wherein the first data storage device and each peer data storage device of the plurality of peer data storage devices include:
a host interface configured to connect to a host system; and
a control bus interface configured to connect to a control bus;
determining, by the first data storage device, a power state of the first data storage device;
receiving, through the control bus interface and from a peer data storage device of the plurality of peer data storage devices, a power change indicator; and
initiating, responsive to the power change indicator, a change in the power state of the first data storage device.

12. The computer-implemented method of claim 11, further comprising:
determining, from a peer message received through the control bus interface, the power change indicator from a value in a payload of the peer message, wherein the power change indicator indicates that another peer data storage device of the plurality of peer data storage devices is in a low power state; and
increasing, responsive to initiating the change in the power state, the power use of the first data storage device for a predetermined operating period.

13. The computer-implemented method of claim 12, wherein increasing the power use of the first data storage device includes entering an overclock range for the first data storage device.

14. The computer-implemented method of claim 12, further comprising:
determining an amount of available power in a power pool corresponding to the plurality of peer data storage devices, wherein the power change indicator includes the amount of available power for use by the first data storage device; and
determining, based on the power change indicator, an increase amount for increasing the power use of the first data storage device, wherein the increase amount is less than the amount of available power.

15. The computer-implemented method of claim 14, further comprising:
sending, from the first data storage device and through the control bus interface, a device power value to at least one data storage device of the plurality of peer data storage devices, wherein receiving the power change indicator is responsive to sending the device power value.

16. The computer-implemented method of claim 11, further comprising:
broadcasting, from the first data storage device and each peer data storage device of the plurality of peer data storage devices, a respective device power value to each other peer data storage device through respective control bus interfaces.

17. The computer-implemented method of claim 11, further comprising:
sending, from the first data storage device and through the control bus interface, a power request to at least one peer data storage device of the plurality of peer data storage devices, wherein receiving the power change indicator is responsive to sending the power request.

18. The computer-implemented method of claim 11, further comprising:
receiving, by a second data storage device in the plurality of peer data storage devices, a corresponding device power value from the first data storage device and each other peer data storage device of the plurality of peer data storage devices;
determining, by the second data storage device and based on aggregating device power values, a power pool value for the first data storage device and the plurality of peer data storage devices;
determining, by the second data storage device and based on the power pool value, the power change indicator; and
sending, from the second data storage device to the first data storage device, the power change indicator.

19. The computer-implemented method of claim 11, further comprising:
receiving, by a second data storage device in the plurality of peer data storage devices and from the first data storage device, a power request, wherein determining the power change indicator is further based on the power request and an overshoot configuration; and determining an operating period for the change in power state of the first data storage device.

20. A storage system, comprising:
a control bus; and
a plurality of peer data storage devices, wherein each peer data storage device of the plurality of peer data storage devices comprises:
  a processor;
  a memory;
  a host interface configured to connect to a host system;
  a control bus interface configured to connect to the control bus;
  means for establishing, through the control bus interface, peer communication among the plurality of peer data storage devices;
  means for determining a power state of that peer data storage device;
  means for receiving, through the control bus interface and from a peer data storage device of the plurality of peer data storage devices, a power change indicator; and
  means for initiating, responsive to the power change indicator, a change in the power state of that peer data storage device.

* * * * *